Feb. 19, 1929.

J. H. LA LONDE

COUPLING

Filed Aug. 26, 1926

1,702,943

J. H. LaLonde
Inventor

Patented Feb. 19, 1929.

1,702,943

UNITED STATES PATENT OFFICE.

JOHN H. LA LONDE, OF JACKSONVILLE, FLORIDA.

COUPLING.

Application filed August 26, 1926. Serial No. 131,723.

This invention relates to a coupling designed primarily for connecting train pipes and for similar purposes, one of the objects of the invention being to provide a coupling the parts of which can be quickly assembled and just as readily disconnected, said parts being so constructed and assembled as to produce steam and air-tight connections.

Another object is to provide a coupling or union which does not require the use of a screw threaded coupling sleeve such as heretofore used in devices of this type.

A still further object is to provide a coupling which is inexpensive to manufacture, formed of two parts, and can be easily operated to join or disconnect the structures to which the device is attached.

Another object is to provide a coupling wherein the inner engaging parts are protected from dirt and moisture, thus rendering the same more durable and efficient than would otherwise be the case.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawings.

Figure 1:
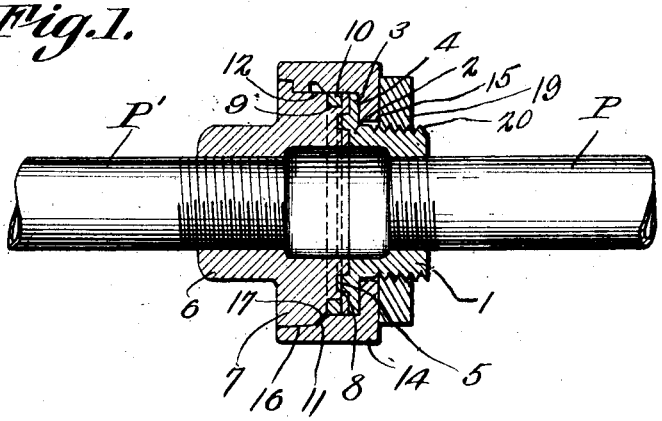
Figure 1 is a central longitudinal section through the coupling.
Figure 2:
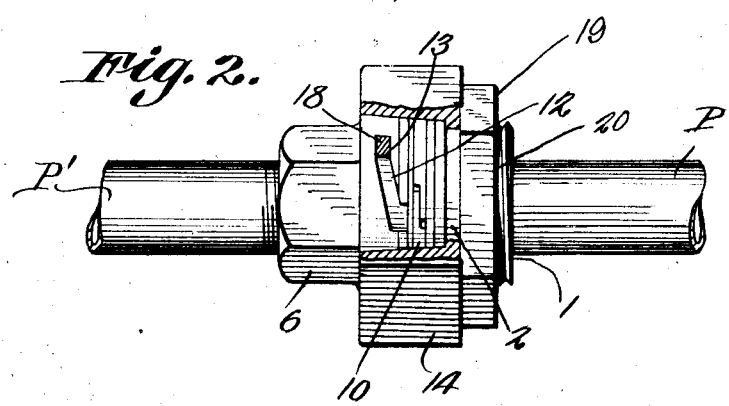
Figure 2 is a plan view thereof, a portion of the sleeve being broken away.
Figure 3:
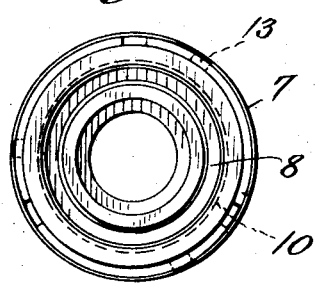
Figure 3 is a face view of the grooved member of the coupling.

Referring to the figures by characters of reference 1 designates an internally screw threaded collar for engaging a pipe P, this collar having an annular enlargement or head 2 extending beyond the ends of the engaged pipe and having an annular flange 3 providing a shoulder 4. Extending from the face of this enlargement of head 2 is a circular rib 5 slightly tapered as shown in Figure 1.

Another collar 6, which is internally screw threaded, is adapted to engage the threaded end of a pipe P'. This collar also has an enlargement or head 7 slightly tapered and formed with a tapered circular groove 8 in its end face for the reception of the tapered rib 5 when the two coupling members are properly assembled. An annular groove 9 is provided in the periphery of the head or enlargement 7 close to the grooved face thereof and in this annular groove 9 is seated a packing ring 10 preferably of metal and of the same general type as used in pistons. Close to this groove 9 the periphery of the head or enlargement 7 is formed with a beveled shoulder 11 extending therearound and opening through this shoulder is one end of an obliquely disposed cam groove 12 formed in the periphery of the head or enlargement and having its inner or closed end portion 13 parallel with the end face of said head or enlargement.

A coupling sleeve 14 is mounted for rotation on the head or enlargement 2 and has an inwardly extended flange 15 adapted to bear against the shoulder 4. A portion of this sleeve is designed to fit snugly upon the flange 3 of the enlargement 2 and upon that portion of the head 7 in which the ring 10 is seated. The outer end portion of the sleeve which is designed to receive the head 7 is slightly tapered as at 16 to form a snug fit against the tapered portion of the head 7 and this sleeve also has an inferior inclined shoulder 17 corresponding with and adapted to abut against the shoulder 11. Extending inwardly from the sleeve 14 close to the shoulder 17 is a lug 18. If a single groove 12 is provided in the head 7 one of these lugs is used. However if two or more grooves are formed in the head 7 a corresponding number of lugs are used. In the drawing three grooves 12 have been shown in the head 7 and three lugs 18 have been provided within the sleeve 14.

Figure 4:
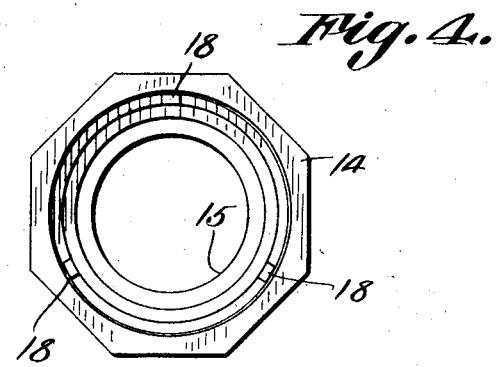
Figure 4 is a face view of the sleeve.

The outer periphery of the sleeve is angular as shown in Figure 4 so that said sleeve can be rotated readily by means of a wrench. A lock nut 19 is in engagement with the exterior threads 20 on collar 1 and serves to hold sleeve 14 against displacement.

When it is desired to assemble the parts of the coupling the two heads 2 and 7 are placed together with the rib 5 seated within the groove 8. The sleeve 14 is then shifted longitudinally so that the lug 18 can enter the open ends of the groove 12. Thereafter said sleeve is given a partial rotation with the result that the lugs 18 will travel within the oblique portions of the grooves 12 and ultimately assume positions within the closed end portions 13. The sleeve is then held by tightening nut 19. During this relative movement of the parts the heads 2 and 7 will be drawn tightly together and the shoulders 11 and 17 will also be pressed together. As the piston ring 10 bears outwardly against the inner surface of the sleeve 14 it will be seen that a tight joint will thus be produced and that steam and air cannot escape. Thus the connection is especially useful with train pipes.

What is claimed is:

In a pipe coupling separate pipe engaging members having end faces adapted to come together, there being a circular tapered groove in one of said faces, a circular tapered rib upon said face of the other member for wedging within the groove, there being a peripheral groove in the grooved member, a packing ring seated within said peripheral groove, the grooved member having an annular beveled shoulder, a sleeve mounted for rotation on one of the members adapted to receive the grooved member for sealing engagement with the packing ring, said sleeve having a beveled annular shoulder for sealing engagement with the shoulder on the grooved member, there being a cam groove in the periphery of the grooved member having one end portion opening through the grooved face of said member and its other end portion closed and parallel with said face, and a lug on the other pipe engaging member insertible into the groove for drawing the pipe engaging members together to wedge the rib in the tapered groove when the sleeve is rotated in one direction and to bind said sleeve against the shoulder on the grooved member, said closed end portion of the cam groove cooperating with the lug to hold the members against accidental separation.

In testimony that I claim the foregoing as my own, I have hereto affixed my signature.

JOHN H. LA LONDE.